(12) United States Patent
Singh et al.

(10) Patent No.: US 11,604,663 B2
(45) Date of Patent: *Mar. 14, 2023

(54) DETECTION OF USER INTERFACE CONTROLS VIA INVARIANCE GUIDED SUB-CONTROL LEARNING

(71) Applicant: Automation Anywhere, Inc., San Jose, CA (US)

(72) Inventors: Sudhir Kumar Singh, Dublin, CA (US); Virinchipuram J Anand, San Ramon, CA (US)

(73) Assignee: Automation Anywhere, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,119

(22) Filed: Nov. 16, 2021

(65) Prior Publication Data
US 2022/0075634 A1 Mar. 10, 2022

Related U.S. Application Data

(63) Continuation of application No. 16/876,530, filed on May 18, 2020, now Pat. No. 11,182,178.

(60) Provisional application No. 62/979,535, filed on Feb. 21, 2020.

(51) Int. Cl.
*G06F 9/451* (2018.01)
*G06F 3/0481* (2022.01)
(52) U.S. Cl.
CPC ............ *G06F 9/451* (2018.02); *G06F 3/0481* (2013.01)

(58) Field of Classification Search
CPC .... G06F 9/451; G06F 3/0481; G06F 3/04855; G06N 20/10; G06N 3/0454; G06N 3/082
See application file for complete search history.

(56) References Cited

U.S. PATENT DOCUMENTS

| 5,949,999 | A | 9/1999 | Song et al. |
| 5,983,001 | A | 11/1999 | Boughner et al. |
| 6,133,917 | A | 10/2000 | Feigner et al. |
| 6,226,407 | B1 | 5/2001 | Zabih et al. |
| 6,389,592 | B1 | 5/2002 | Ayres et al. |

(Continued)

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

(Continued)

*Primary Examiner* — Hien L Duong

(57) ABSTRACT

Computerized detection of one or more user interface objects is performed by processing an image file containing one or more user interface objects of a user interface generated by an application program. Sub-control objects can be detected in the image file, where each sub-control object can form a portion of a user interface object that receives user input. Extraneous sub-control objects can be detected. Sub-control objects that overlap with or that are within a predetermined vicinity of an identified set of sub-control objects can be removed. Sub-control objects in the identified set of sub-control objects can be correlated to combine one or more of the sub-control objects in the identified set of sub-control objects to generate control objects that correspond to certain of the user interface objects of the user interface generated by the application program.

22 Claims, 14 Drawing Sheets

(56) References Cited

U.S. PATENT DOCUMENTS

| | | | |
|---|---|---|---|
| 6,427,234 B1 | 5/2002 | Chambers et al. | |
| 6,473,794 B1 | 10/2002 | Guheen et al. | |
| 6,496,979 B1 | 12/2002 | Chen et al. | |
| 6,640,244 B1 | 10/2003 | Bowman-Amuah | |
| 6,704,873 B1 | 3/2004 | Underwood | |
| 6,898,764 B2 | 5/2005 | Kemp | |
| 6,954,747 B1 | 10/2005 | Wang et al. | |
| 6,957,186 B1 | 10/2005 | Guheen et al. | |
| 7,091,898 B2 | 8/2006 | Arling et al. | |
| 7,246,128 B2 | 7/2007 | Jordahl | |
| 7,398,469 B2 | 7/2008 | Kisamore et al. | |
| 7,441,007 B1 | 10/2008 | Kirkpatrick et al. | |
| 7,533,096 B2 | 5/2009 | Rice et al. | |
| 7,568,109 B2 | 7/2009 | Powell et al. | |
| 7,571,427 B2 | 8/2009 | Wang et al. | |
| 7,765,525 B1 | 7/2010 | Davidson et al. | |
| 7,805,317 B2 | 9/2010 | Khan et al. | |
| 7,805,710 B2 | 9/2010 | North | |
| 7,810,070 B2 | 10/2010 | Nasuti et al. | |
| 7,846,023 B2 | 12/2010 | Evans et al. | |
| 8,028,269 B2 | 9/2011 | Bhatia et al. | |
| 8,056,092 B2 | 11/2011 | Allen et al. | |
| 8,095,910 B2 | 1/2012 | Nathan et al. | |
| 8,132,156 B2 | 3/2012 | Malcolm | |
| 8,209,738 B2 | 6/2012 | Nicol et al. | |
| 8,234,622 B2 | 7/2012 | Meijer et al. | |
| 8,245,215 B2 | 8/2012 | Extra | |
| 8,352,464 B2 | 1/2013 | Folev | |
| 8,396,890 B2 | 3/2013 | Lim | |
| 8,438,558 B1 | 5/2013 | Adams | |
| 8,443,291 B2 | 5/2013 | Ku et al. | |
| 8,464,240 B2 | 6/2013 | Fritsch et al. | |
| 8,498,473 B2 | 7/2013 | Chong et al. | |
| 8,504,803 B2 | 8/2013 | Shukla | |
| 8,631,458 B1 | 1/2014 | Banerjee | |
| 8,682,083 B2 | 3/2014 | Kumar et al. | |
| 8,713,003 B2 | 4/2014 | Fotev | |
| 8,769,482 B2 | 7/2014 | Batey et al. | |
| 8,819,241 B1 | 8/2014 | Washburn | |
| 8,832,048 B2 | 9/2014 | Lim | |
| 8,874,685 B1 | 10/2014 | Hollis et al. | |
| 8,943,493 B2 | 1/2015 | Schneider | |
| 8,965,905 B2 | 2/2015 | Ashmore et al. | |
| 9,032,314 B2 | 5/2015 | Mital et al. | |
| 9,104,294 B2 | 8/2015 | Forstall et al. | |
| 9,213,625 B1 | 12/2015 | Schrage | |
| 9,278,284 B2 | 3/2016 | Ruppert et al. | |
| 9,444,844 B2 | 9/2016 | Edery et al. | |
| 9,462,042 B2 | 10/2016 | Shukla et al. | |
| 9,571,332 B2 | 2/2017 | Subramaniam et al. | |
| 9,600,519 B2* | 3/2017 | Schöning | G06F 16/24 |
| 9,621,584 B1 | 4/2017 | Schmidt et al. | |
| 9,946,233 B2 | 4/2018 | Brun et al. | |
| 10,043,255 B1* | 8/2018 | Pathapati | G06N 20/00 |
| 10,282,280 B1 | 5/2019 | Gouskova | |
| 11,182,178 B1 | 11/2021 | Singh et al. | |
| 2003/0033590 A1 | 2/2003 | Leherbauer | |
| 2003/0101245 A1 | 5/2003 | Srinivasan et al. | |
| 2003/0159089 A1 | 8/2003 | DiJoseph | |
| 2004/0083472 A1 | 4/2004 | Rao et al. | |
| 2004/0153649 A1 | 8/2004 | Rhoads | |
| 2004/0172526 A1 | 9/2004 | Tann et al. | |
| 2004/0210885 A1 | 10/2004 | Wang et al. | |
| 2004/0243994 A1 | 12/2004 | Nasu | |
| 2005/0188357 A1 | 8/2005 | Derks et al. | |
| 2005/0204343 A1 | 9/2005 | Kisamore et al. | |
| 2005/0234699 A1* | 10/2005 | Morrison | G06Q 10/02 703/23 |
| 2005/0257214 A1 | 11/2005 | Moshir et al. | |
| 2006/0095276 A1 | 5/2006 | Axelrod et al. | |
| 2006/0150188 A1 | 7/2006 | Roman et al. | |
| 2007/0101291 A1 | 5/2007 | Forstall et al. | |
| 2007/0112574 A1 | 5/2007 | Greene | |
| 2007/0156677 A1 | 7/2007 | Szabo | |
| 2008/0005086 A1 | 1/2008 | Moore | |
| 2008/0027769 A1 | 1/2008 | Eder | |
| 2008/0028392 A1 | 1/2008 | Chen et al. | |
| 2008/0209392 A1 | 8/2008 | Able et al. | |
| 2008/0222454 A1 | 9/2008 | Kelso | |
| 2008/0263024 A1 | 10/2008 | Landschaft et al. | |
| 2009/0037509 A1 | 2/2009 | Parekh et al. | |
| 2009/0103769 A1 | 4/2009 | Milov et al. | |
| 2009/0116071 A1 | 5/2009 | Mantell | |
| 2009/0172814 A1 | 7/2009 | Khosravi et al. | |
| 2009/0199160 A1 | 8/2009 | Vaitheeswaran et al. | |
| 2009/0217309 A1 | 8/2009 | Grechanik et al. | |
| 2009/0249297 A1 | 10/2009 | Doshi et al. | |
| 2009/0313229 A1 | 12/2009 | Fellenstein et al. | |
| 2009/0320002 A1 | 12/2009 | Peri-Glass et al. | |
| 2010/0023602 A1 | 1/2010 | Marlone | |
| 2010/0023933 A1 | 1/2010 | Bryant et al. | |
| 2010/0100605 A1 | 4/2010 | Allen et al. | |
| 2010/0106671 A1 | 4/2010 | Li et al. | |
| 2010/0138015 A1 | 6/2010 | Colombo et al. | |
| 2010/0235433 A1 | 9/2010 | Ansari et al. | |
| 2010/0251163 A1* | 9/2010 | Keable | G06F 40/205 715/780 |
| 2011/0022578 A1 | 1/2011 | Folev | |
| 2011/0145807 A1 | 6/2011 | Molinie et al. | |
| 2011/0197121 A1 | 8/2011 | Kletter | |
| 2011/0276568 A1 | 11/2011 | Fotev | |
| 2011/0276946 A1 | 11/2011 | Pletter | |
| 2011/0302570 A1 | 12/2011 | Kurimilla et al. | |
| 2012/0011458 A1 | 1/2012 | Xia et al. | |
| 2012/0042281 A1 | 2/2012 | Greene | |
| 2012/0124062 A1 | 5/2012 | Macbeth et al. | |
| 2012/0131456 A1* | 5/2012 | Lin | G06F 11/3672 715/704 |
| 2012/0324333 A1* | 12/2012 | Lehavi | G06F 11/3668 715/234 |
| 2012/0330940 A1 | 12/2012 | Caire et al. | |
| 2013/0173648 A1 | 7/2013 | Tan et al. | |
| 2013/0290318 A1 | 10/2013 | Shapira et al. | |
| 2014/0036290 A1 | 2/2014 | Miyagawa | |
| 2014/0045484 A1 | 2/2014 | Kim et al. | |
| 2014/0181705 A1 | 6/2014 | Hey et al. | |
| 2014/0189576 A1* | 7/2014 | Carmi | G06V 10/752 715/781 |
| 2014/0282125 A1* | 9/2014 | Duneau | G06F 9/451 715/762 |
| 2015/0082280 A1 | 3/2015 | Betak et al. | |
| 2015/0310268 A1 | 10/2015 | He | |
| 2015/0347284 A1 | 12/2015 | Hey et al. | |
| 2016/0019049 A1 | 1/2016 | Kakhandiki et al. | |
| 2016/0034441 A1 | 2/2016 | Nguyen et al. | |
| 2016/0078368 A1* | 3/2016 | Kakhandiki | G06N 5/04 706/12 |
| 2018/0113781 A1 | 4/2018 | Kim | |
| 2018/0275835 A1 | 9/2018 | Prag | |
| 2019/0126463 A1 | 5/2019 | Purushothaman | |
| 2019/0141596 A1 | 5/2019 | Gay | |
| 2019/0188462 A1 | 6/2019 | Nishida | |
| 2019/0317803 A1 | 10/2019 | Maheshwari | |

OTHER PUBLICATIONS

B.P. Kasper "Remote: A Means of Remotely Controlling and Storing Data from a HAL Quadrupole Gass Analyzer Using an IBM-PC Compatible Computer", Nov. 15, 1995, Space and Environment Technology Center.

Bergen et al., RPC automation: making legacy code releant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2006).

Tom Yeh, Tsung-Hsiang Chang, and Robert C. Miller, Sikuli: Using GUI Screenshots for Search and Automation, Oct. 4-7, 2009, 10 pages.

(56) References Cited

OTHER PUBLICATIONS

Yu et al., Deplying and managing Web services: issues, solutions, and directions, 36 pages (Year: 2008).
Zhifang et al., Test automation on moble device, May 2010, 7 pages.
Non-Final Office Action for U.S. Appl. No. 17/230,492, dated Oct. 14, 2022.
Notice of Allowance for U.S. Appl. No. 16/398,532, dated Oct. 23, 2022.
Non-Final Office Action for U.S. Appl. No. 16/876,530, dated Sep. 29, 2020.
Final Office Action for U.S. Appl. No. 16/876,530, dated Apr. 13, 2021.
Notice of Allowance for U.S. Appl. No. 16/876,530, dated Jul. 22, 2021.

* cited by examiner

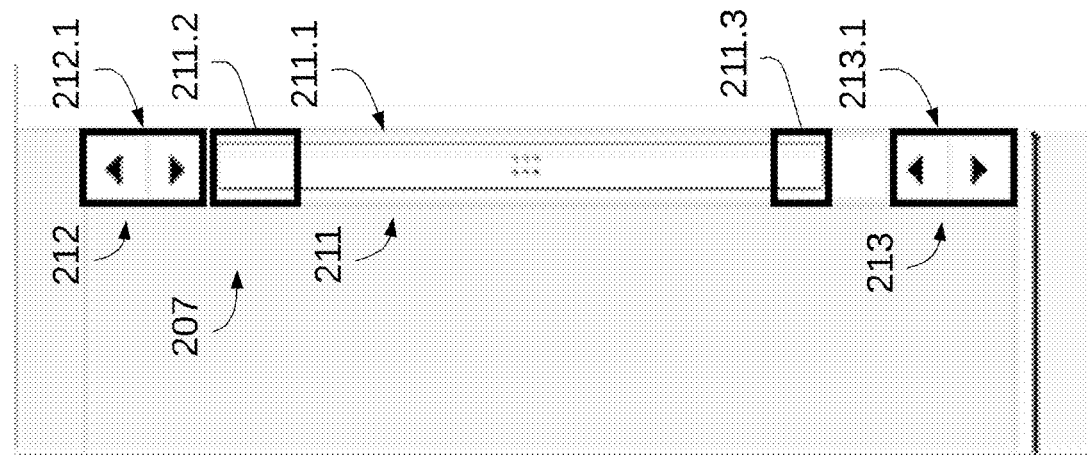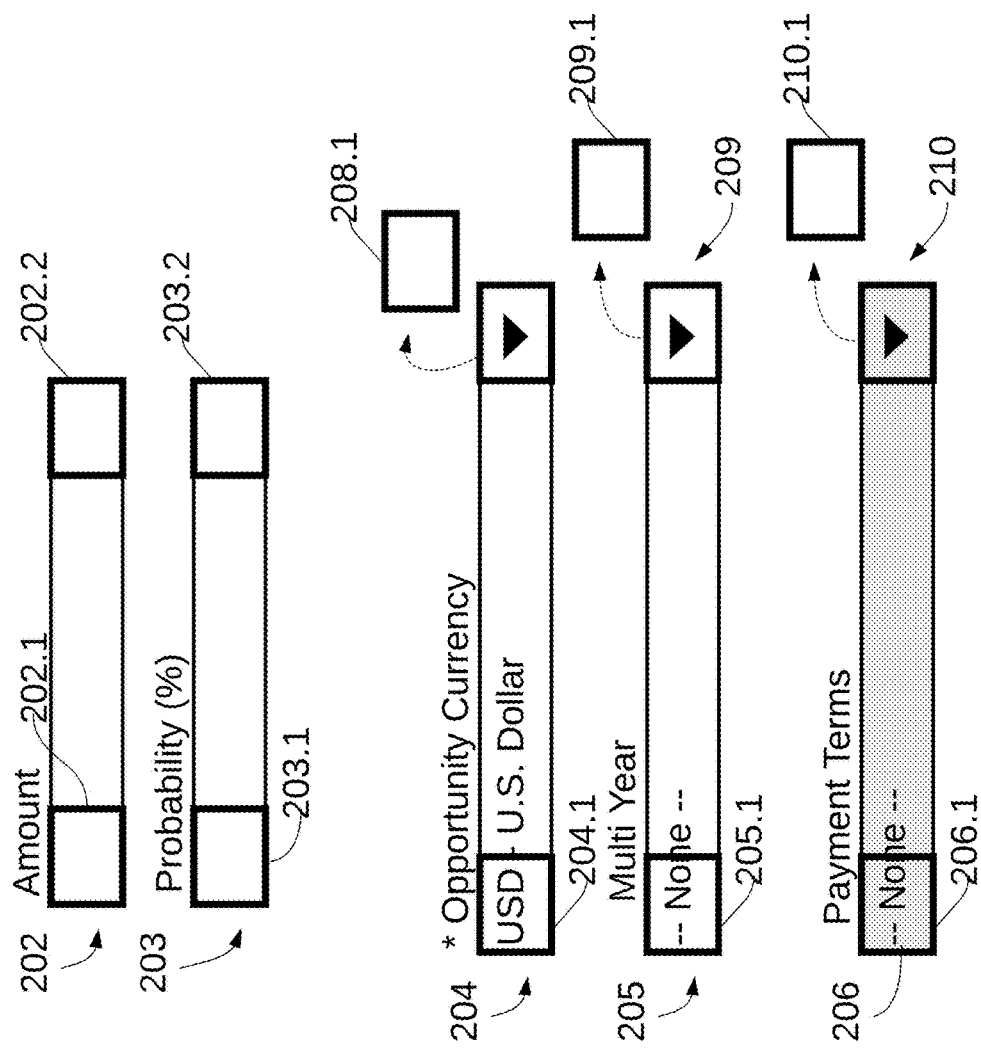
FIG. 2C

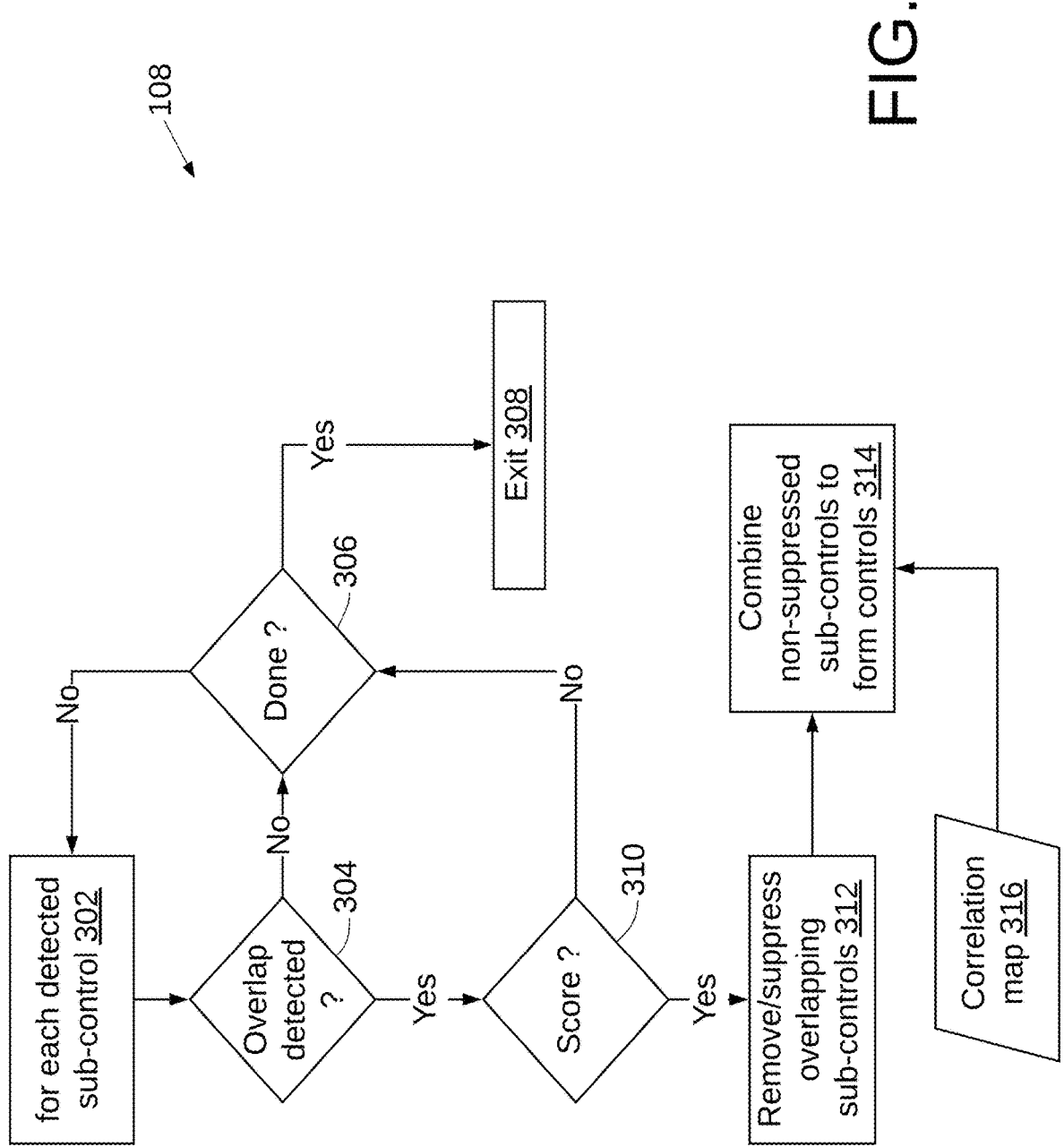

FIG. 11

DETECTION OF USER INTERFACE CONTROLS VIA INVARIANCE GUIDED SUB-CONTROL LEARNING

CROSS-REFERENCE TO RELATED APPLICATIONS

This application is a continuation of U.S. application Ser. No. 16/876,530, filed May 18, 2020, and entitled "DETECTION OF USER INTERFACE CONTROLS VIA INVARIANCE GUIDED SUB-CONTROL LEARNING," which is hereby incorporated herein by reference in its entirety, and which in turn claims priority to U.S. patent application 62/979,535 filed on Feb. 21, 2020 and entitled SYSTEM AND METHOD FOR DETECTING UI CONTROLS VIA INVARIANCE GUIDED SUB-CONTROL LEARNING, which application is hereby incorporated by reference in its entirety.

FIELD OF THE DISCLOSURE

This disclosure relates generally to the field of data processing systems and more particularly to detection of objects in images.

BACKGROUND

Robotic process automation (RPA) is the application of technology that allows workers in an organization to configure computer software, known as a "robot" or "bot" to capture, interpret, and execute actions or commands in existing third-party applications for processing a transaction, manipulating data, triggering responses and communicating with other digital systems. The conventional RPA systems employ the robots or bots to interpret the user interface of such third-party applications and to execute actions or commands as a human worker or user would.

In particular, as the demand for automation increases, it is imperative to recognize user interface (UI) controls in legacy application programs which do not provide programmatic access, in order to automate usage of such applications. For websites, the code is available in one form or another so detection of controls and their type on the website is relatively straightforward. However, many licensed applications do not allow access to their code. Moreover, in certain situations, applications may be used by an automation user by way of remote desktop type software where only the screen image is available to the user. Automated detection of UI controls on such applications for automation is a challenge.

In such scenarios, since the application cannot provide information about the location and property of the UI controls, techniques to infer such information from image or video screenshots of the application are sometimes utilized. This poses challenges for existing artificial intelligence and machine learning techniques. Other techniques such as template-based methods that compare pixel values directly fail on even small variations in the application (e.g. resolution, window size etc.). Moreover, such techniques are further limited to one or two UI controls.

SUMMARY

Computerized detection of one or more user interface objects contained in a screen image of a user interface generated by an application program can be performed by processing an image file containing one or more user interface objects of a user interface generated by an application program. Sub-control objects can be detected in the image file, where each sub-control object can form a portion of a user interface object that receives user input. Extraneous sub-control objects can also be deleted. Sub-control objects that overlap with or that are within a predetermined vicinity of an identified set of sub-control objects can be removed. Sub-control objects in the identified set of sub-control objects can be correlated to combine one or more of the sub-control objects in the identified set of sub-control objects to generate controls that correspond to certain of the user interface objects of the user interface generated by the application program.

In certain embodiments, for each detected sub-control object, a confidence score associated with the sub-control object may be retrieved and sub-control objects having a confidence score below a score threshold can be removed. For each identified control a confidence score may also be generated to permit controls having a confidence score below another threshold to be removed. Extraneous sub-control objects may be removed by detecting and removing sub-control objects that overlap with or that are within a predetermined vicinity of an identified set of sub-control objects.

These and additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIGS. 2A, 2B, and 2C illustrate operation of various aspects of an embodiment in the context of images of UI interface objects.

FIG. 3 is a flow diagram illustrating operation of an embodiment UI object generation from a set of detected sub-control objects.

FIGS. 9, 10 and 11 are screenshots showing examples of sub-control object detection and alignment.

DETAILED DESCRIPTION

Figure 1:
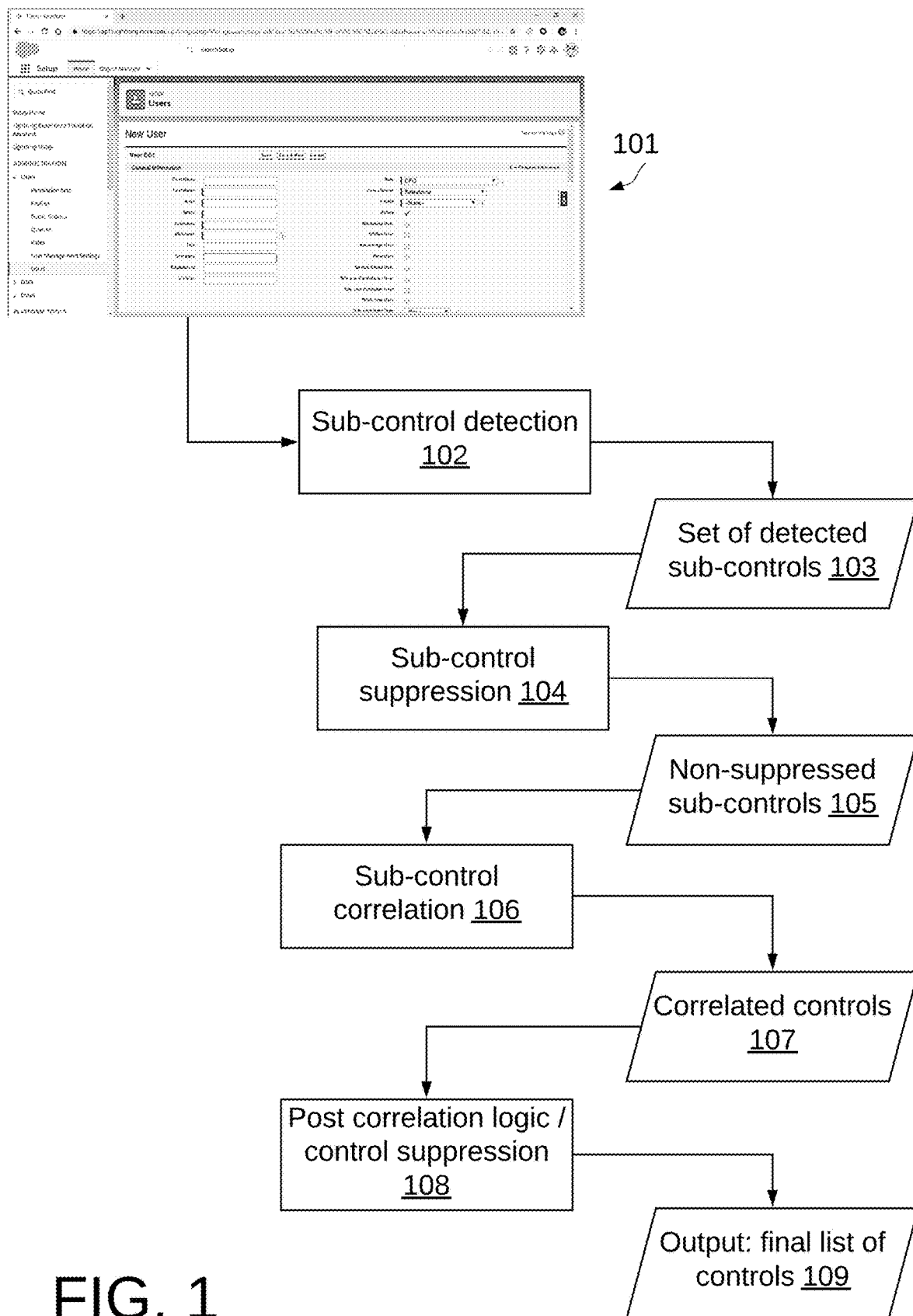
FIG. 1 is a high-level flow diagram illustrating operation of an embodiment of a User Interface (UI) interface object detection system.

In the following detailed description, reference will be made to the accompanying drawings, in which identical functional elements are designated with like numerals. Elements designated with reference numbers ending in a suffix such as 0.1, 0.2, 0.3 are referred to collectively by employing the main reference number without the suffix. For example, 100 refers to topics 100.1, 100.2, 100.3 generally and collectively. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Disclosed herein is a system and method that addresses the problem of UI control detection encompassing the scenarios described above. The disclosed embodiments utilize only the visual aspects of the UI and are agnostic to applications, application frameworks, computing environments and agnostic to where those applications reside, out of or behind firewalls and virtual or remote desktops. This disclosure presents embodiments for detecting UI control elements or objects by employing detected control sub-objects, which are portions or parts of UI control objects, with a correlation module to combine the sub-control objects to form identified UI control objects. Such embodiments improve the accuracy with which UI controls are detected, thereby enhancing and improving application automation.

An embodiment for generating a trained model that can be employed to detect control sub-objects is then described. Computer applications commonly include User Interface (UI) control objects, for example text entry boxes or drop-down selection menus, that a user interacts with to complete one or more tasks. These control objects receive for example, mouse clicks or keyboard inputs or combinations thereof from the user to facilitate one or more actions intended to complete an intended task. Therefore, any system that understands and automates such tasks, such as a Robotics Process Automation (RPA) system, and which interacts with such a computer application utilizes understanding of such UI controls. Further, understanding and automating processes, which comprise a sequence of tasks, may involve performing one or more tasks within one or more applications. Therefore, a system and method that detects UI controls across several applications is desirable. Such systems and methods that are robust and fast allow for accurate task and process automation that is very significant from a business value perspective.

The task of UI control detection becomes even more challenging when the corresponding applications reside in virtual and remote desktop environments and/or behind firewalls. In such cases, the user's computer has no direct access to the application but only an image or video screenshots that the user can interact with using a keyboard and mouse. In such scenarios, any method to detect UI controls use images, videos, or screenshots of the applications as input. Usage of systems employing such virtual and remote desktop environments continues to be highly desirable given increasingly high standard safety and privacy requirements and regulations. Further, information technology departments prefer installing applications that require high complexity computing environments in virtualized computers so that they don't have to teach or support each of their employees individually with respect to installing and maintaining these applications on their computers.

Even though an application may look the same and interact in the same way across different computing environments, the internal functionalities of how it implements those interactions may vary quite a bit across computers, depending on what underlying application framework, operating system and hardware those particular computers have. For example, a web page may look almost same to the user and would work the same way whether a user views it in the Firefox® browser, Internet Explorer® browser or Chrome® browser, but the internal workings of these browsers and how they interact with operating system are very different from each other. Similarly, a Java®-based Oracle application would look the same on two computers, such as one with Windows® OS and the other with Mac® OS but their underlying JVMs (Java Virtual Machines) are very different. Further, the speed of the application will be governed by the underlying hardware of those computers. A UI control detection method that is agnostic to application framework and computing environments is therefore desirable. An image or video-based method is accordingly desirable in this case and in particular one that uses only the visual aspects of the UI and not the internal workings of the UI. Such a technique would thereby be inherently agnostic to application frameworks and computing environments.

Figure 2A:
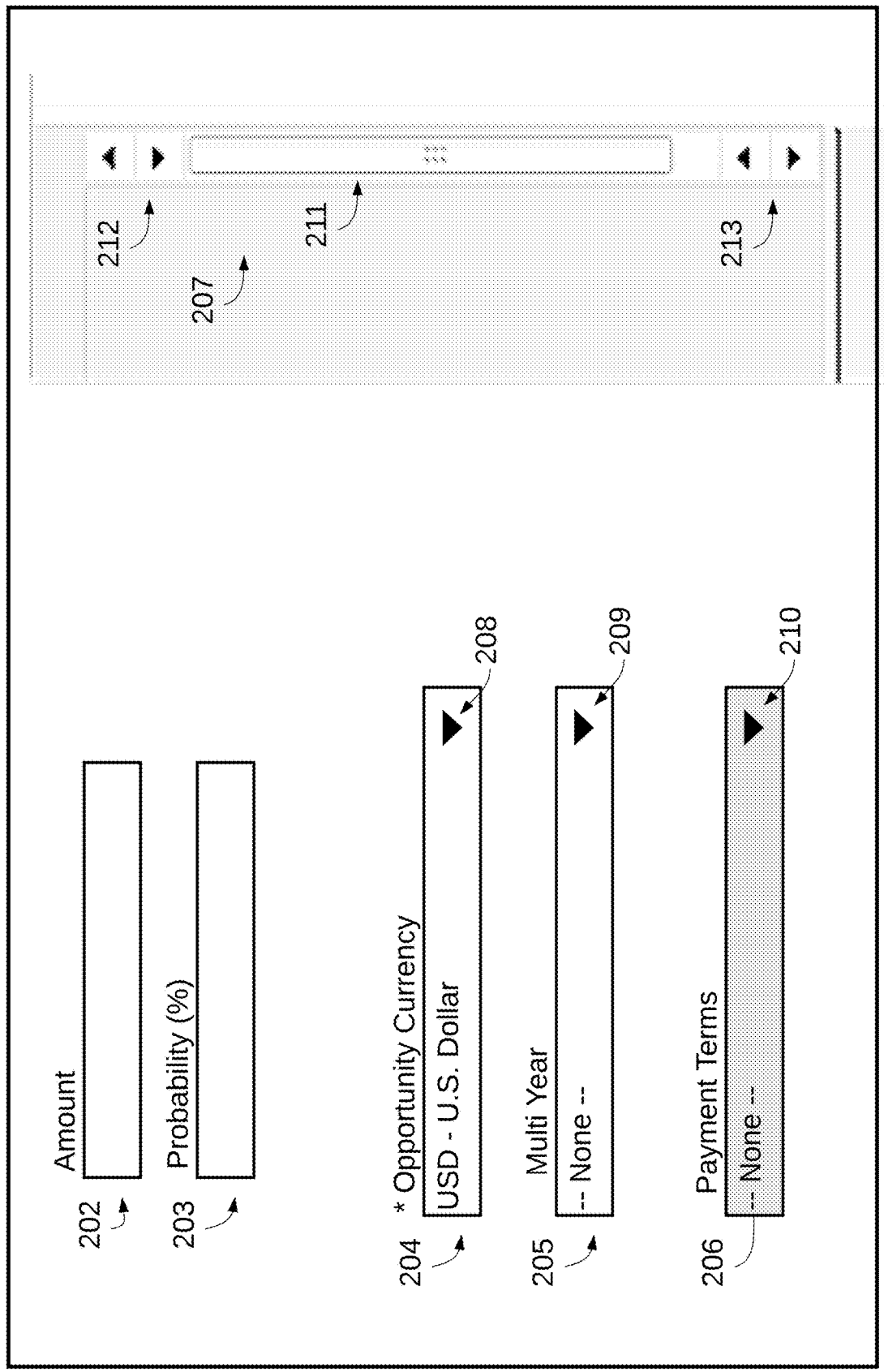
Figure 2B:
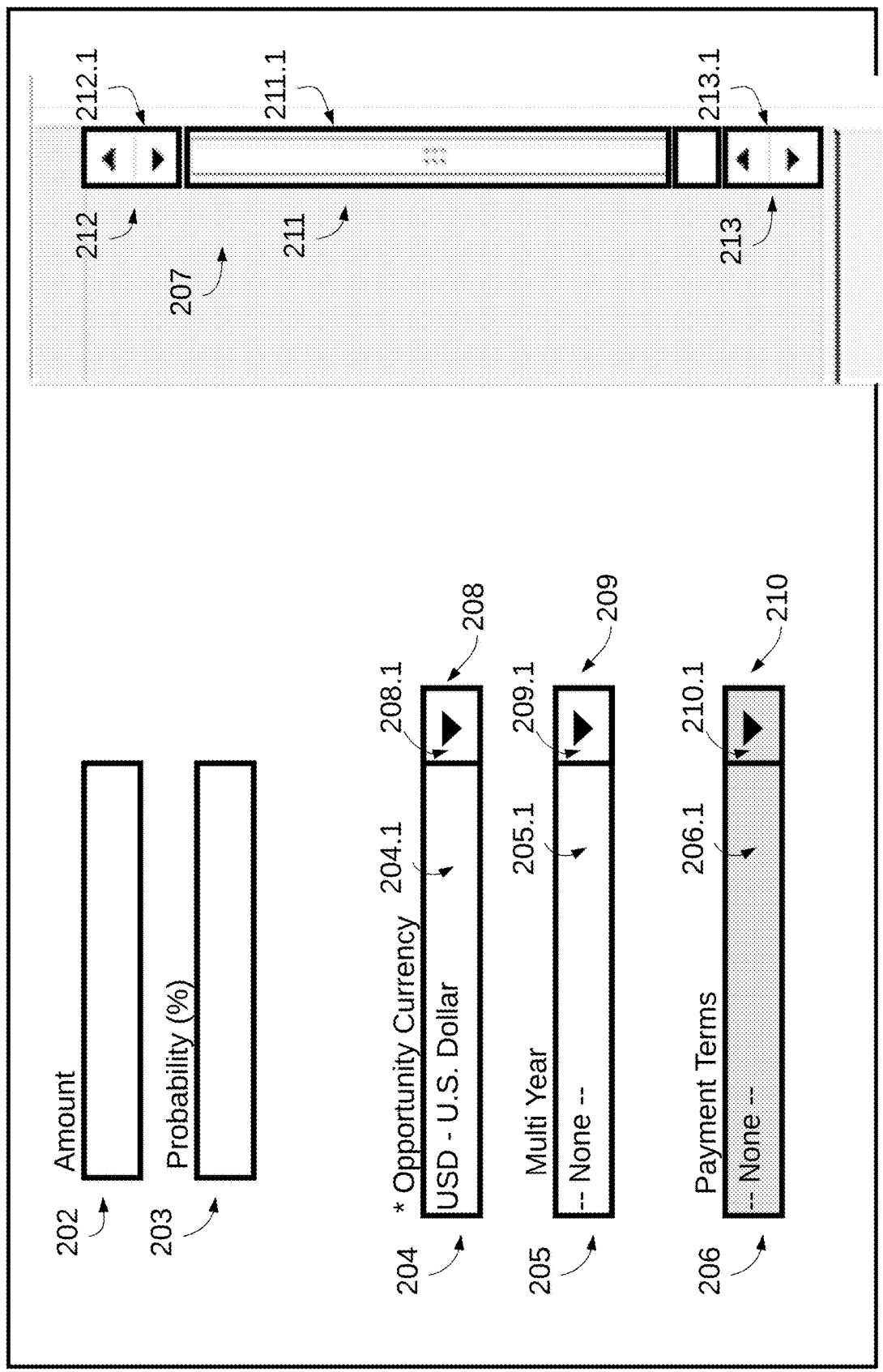

FIG. 1 is a high-level flow diagram illustrating operation of an embodiment of a UI interface control object detection system. In FIG. 1, an image file 101, as generated by capturing an image displayed on a computer monitor by a software application program, is provided to a sub-control detection module 102. An example of an image displayed by an application program is shown in FIG. 2A where a plurality of UI image objects 202-207 are shown. UI image objects 202 and 203 are text input field objects that may accept data inputted by a user. UI image objects 204, 205, 206, referred to as drop-down menu objects, are also input fields but accept a selection among a listing of inputs that are provided by selection of an associated drop-down control object such as shown at 208, 209, 210. UI image object 207, referred to as a scroll bar object, is a scrolling mechanism that permits vertical scrolling by way of slider bar 211 or up/down arrows 212, 213. FIG. 2B shows the UI image objects in FIG. 2A recognized by an embodiment of the present disclosure, which has generated a bounding box, as designated by the thick lines around the perimeter of the various UI image control objects. When an object is "recognized" as described herein, it has been identified from an image as a particular type of UI control object. Each of the text box control objects 202 and 203 include of only a single portion. Each of the dropdown control objects 204, 205, and 206 are comprised of two sub-objects: a selection label sub-object 204.1, 205.1, and 206.1, and a dropdown selector sub-object, with the corresponding bounding boxes shown at 208.1, 209.1, and 210.1. Control object 207 which is comprised of three sub-objects, has each of the sub-objects separately recognized: slider bar object 211.1 and up/down arrow objects 212.1, 213.1.

UI control objects are typically built from a visual effect, layout and style library. Because such libraries offer a finite number of UI control objects, such objects follow similar invariance characteristics from a cosmetic visual details perspective. In other words, any given type of UI control object will have many visual aspects in common but will vary in certain characteristics (referred to herein as "invariance") such as the dimensions. A text box control object may be of varying widths and heights. A dropdown control object may also be of varying widths and heights. Invariance, in the context of this disclosure, refers to a parameter that, regardless of the value of the parameter, within a range of values, corresponds to a single property. An invariance parameter may have a relatively large range of possible values, e.g., for certain invariance parameters such as height and width, yet still correspond to the same type of UI control object. Parameters that are invariant across such large ranges make it more difficult for machine learning models to recognize these invariance parameters and properly identify certain UI control objects, and still be slim, thereby reducing their expressiveness. In this context, slim refers to the machine learning model and the number of parameters employed in the model have a relatively smaller size. Expressiveness of a machine learning model refers to the ability of the structural property of the model to affect the function it computes. For example, the aspect ratio of a textbox object such as seen at 202/203 can vary anywhere from say 1 to above 500 which is a large range. Any machine learning model that directly tries to learn to account for an invariance parameter (i.e. the aspect ratio in this case) will likely struggle and will likely be inferior in expressive power compared to a model which could somehow avoid this, certain UI control objects necessarily need their sub-objects detected as well from the perspective of completing an action on those UI objects. For example, a dropdown object such as 204-206 needs the dropdown control object, such as 208-210, that can be clicked as well, and a scrollbar object such as 207 needs detection of the handle sub-object, such as 211, to effectively use the scrollbar object.

Disclosed embodiments identify such invariance parameters and break a UI object into certain constituent object parts, or component sub-objects, also referred to as sub-control objects, so that the constituent object parts have a limited variability range with respect to the invariance parameter and are amenable to be learned effectively by a machine learning model. For example, as shown in FIG. 2C, in the case of a textbox object such as 202 or 203, which may have an object class "TEXTBOX" and an invariance parameter 'aspect ratio', may be broken down into two parts—(1) "LEFT_TEXTBOX" sub-object 202.1, 203.1 created using the left most part of the textbox object with the original height, and the width equal to the original height (2) "RIGHT_TEXTBOX" sub-object 202.2, 203.2 created using the right most part of the textbox object with the original height, and the width equal to the original height. Once a model learns to detect these sub-object parts, these sub-objects (i.e. "LEFT_TEXTBOX" and "RIGHT_TEXTBOX") are combined to construct the object "TEXTBOX". Note that in this case, now the aspect ratio of the objects is not a problematic invariance parameter anymore. Dropdown objects 204, 205, 206 are similarly broken into left constituent sub-objects 204.1, 205.1, 206.1 and right constituent sub-objects, such as 208.1, 209.1, 210.1 object or create another object e.g. 204.2]. Slider bar object 211 is also similarly broken into upper and lower constituent sub-objects 211.2 and 211.3 which represent the upper and lower boundary areas of the slider bar object 211. In one embodiment, the constituent sub-objects (such as 202.1, 202.2) have a width equal to the height. In other embodiments, for example, there may be a textbox with width smaller than height. In such a case, both LEFT_TEXTBOX and RIGHT_TEXTBOX sub-objects will be same as the TEXTBOX object. So, the width of RIGHT/LEFT_TEXTBOX sub-object will be actually the minimum of the height and the width of the corresponding TEXTBOX object.

Turning back to FIG. 1, an embodiment is shown that detects UI control objects, such as shown in FIGS. 2A-2C, by first detecting the sub-objects (the object parts in context of UI control objects) learned by an invariance guidance process, followed by a correlation module, to combine the detected sub-control objects to obtain the desired UI control objects. Image 101 may be a screenshot image or a sequence of screenshot images of one or more application user interfaces. This image 101 is consumed by a sub-control detection module 102, such as described in connection with FIG. 8. Sub-control detection module 102 outputs a set of detected sub-control objects 103, $S=\{s_i\}$, where each detected instance $s_i=(box_i, score_i, label_i)$ in the form of a bounding box, box' (such as seen in FIG. 2C, e.g. 202.1, 203.1, 204.1, 205.1, 206.1, etc.) (as diagonal corner co-ordinates or top left corner coordinate along with height and width), the sub-control class label $label_i$ and a confidence score $score_i$ that is retrieved and which indicates a level of confidence of the accuracy of the detection of the detected sub-control object.

Figure 4:
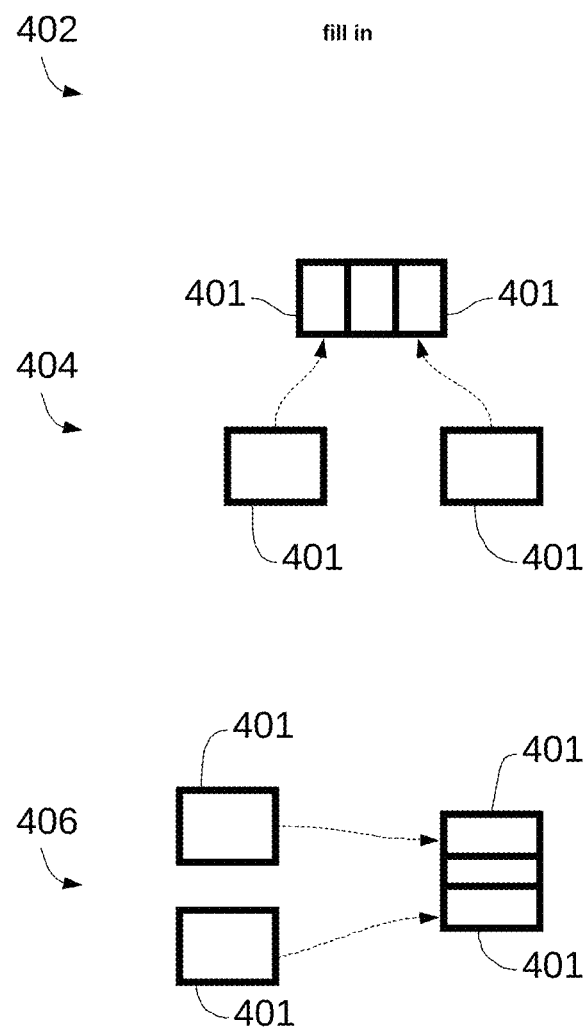
FIG. 4 illustrates various examples of overlaps of bounding boxes.
Figure 9:
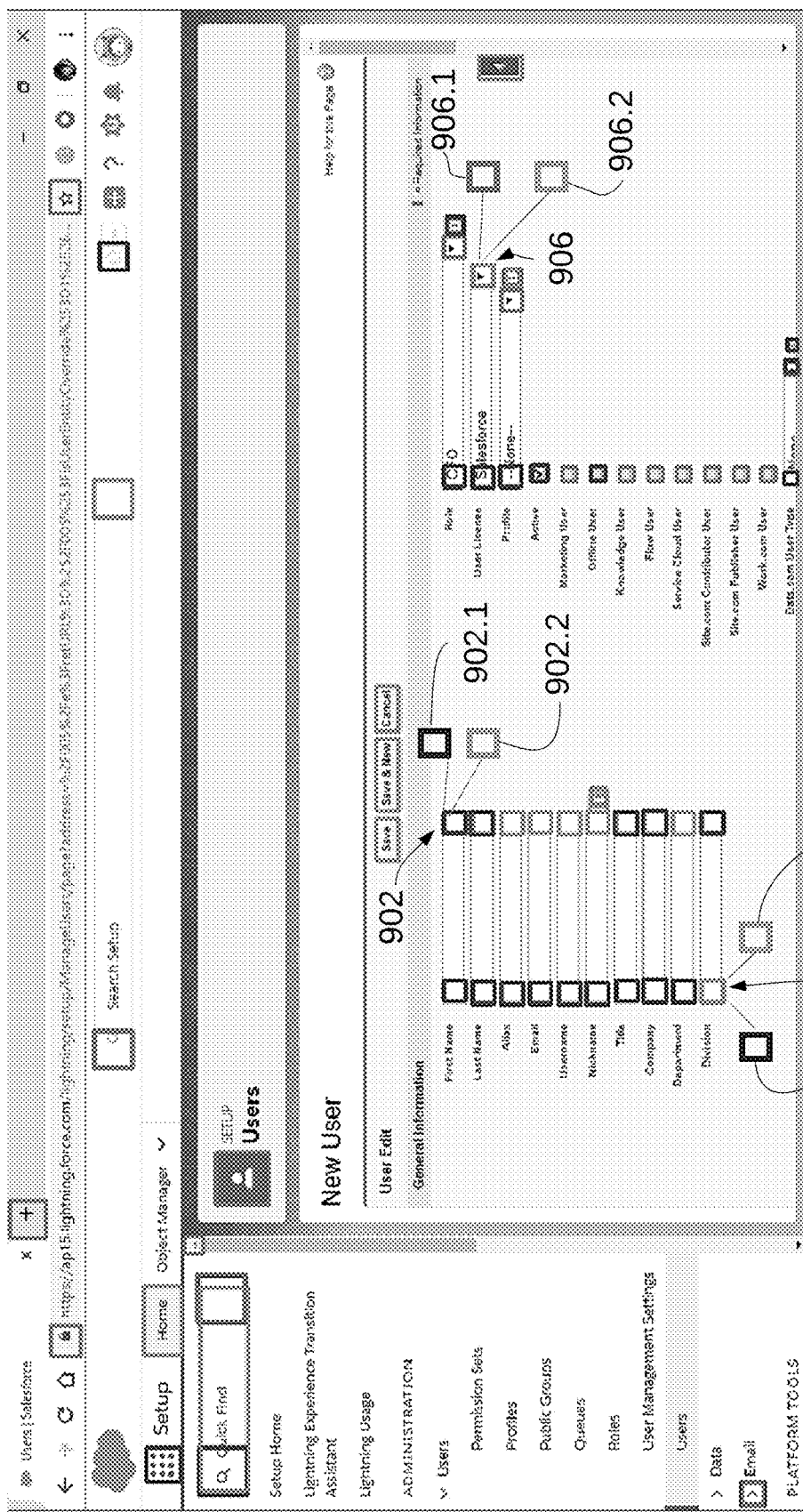

The detected sub-control bounding boxes may overlap with each other and may correspond to the same correct sub-control object. That means that a subset of these detected sub-control objects may be redundant and may even interfere in combining sub-control objects to obtain the corresponding object. This is shown in FIG. 9. The visualization can be sometimes hard to show as the bounding boxes may be on top of one another. In FIG. 9, sub-object 902.1 (a LEFT_TEXTBOX) and sub-object 902.2 (a RIGHT_TEXTBOX) are two different sub-control objects detected almost exactly at the same place 902 but 902.1 has a significantly lower score so gets suppressed and only 902.2 remains which is the correct sub-control object. Similarly, for 904 with the role of left and right reversed. At 906, a RIGHT_TEXTBOX sub-object 906.1 and a DROPDOWN_HANDLE sub-object 906.2 are detected but 906.1 has significantly lower score so gets suppressed and only 906.2 remains, which is the correct sub-control object in this case. The detected sub-control bounding boxes may additionally have lower confidence scores compared to other detected sub-control objects. Sub-control suppression module 104 operates as shown in FIG. 3 to compute and throw away such extraneous sub-control objects as follows. The loop of operations 302, 304, 306 is performed for each detected sub-control object to address overlaps and further at 310 to address lower confidence scores. At 302, for each detected control sub-object $$s_i=(box_i, score_i, label_i)$$

if another detected sub-control object can be found $$s_j=(box_j, score_j, label_j)$$

wherein at 304 $box_j$ overlaps with $box_i$ beyond a threshold, and corresponding score $score_j$ at 310 lies in an interval compared to score $score_i$. For $s_j$, at 312, the sub-control object $s_i$ is suppressed or thrown away. In one embodiment, as shown in FIG. 4 the overlap between two boxes is computed as a combination of one or more of: (i) intersection over union of the boxes 402, (ii) overlap along width of the boxes 404, and (iii) overlap along height of the boxes 406. Intersection over union of the boxes 402 refers to the area of overlap of two boxes (the intersection) divided by the union of the two boxes combined area (the overlapping and non-overlapping areas).

In FIG. 4, each box 401 is shown separately with a dotted arrow to the respective combination 402, 404, 406 to aid in understanding. In one embodiment, the suppression interval for $s_i$ might be anything below a minimum of 0.5 and 0.9 times $score_j$. The result of this operation is a subset 105 of the originally detected sub-control objects being retained which form the set of $$\text{Nonsuppressed subcontrols } T=\{t_j\} \text{ where } t_j=(box_j, score_j, label_j)$$

Figure 5:
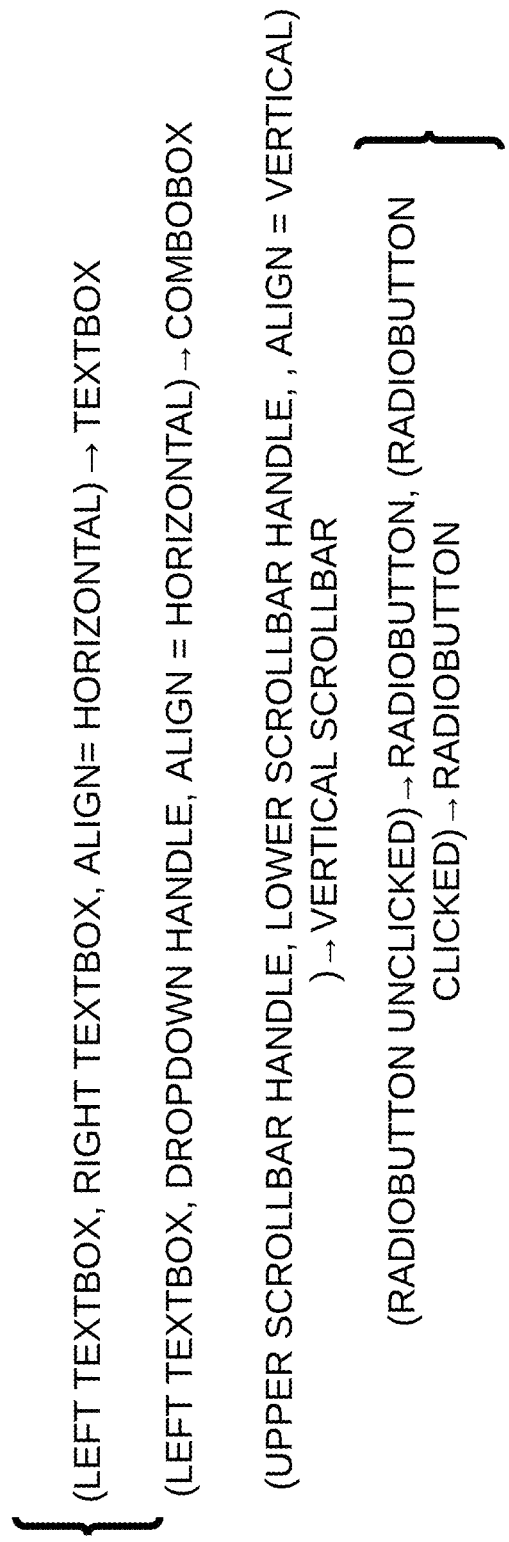
FIG. 5 illustrates details of one embodiment of a correlation map.

The above set of detected non-suppressed control sub-objects 105 are combined at 314 to obtain the corresponding control objects 107 in sub-control correlation module 106. Every sub-control object class corresponds to one or more control object classes and is provided as a correlation map 316 to this step. For example, a LEFT TEXTBOX corresponds to classes "TEXTBOX" and "COMBOBOX/DROPDOWN" when matched with a RIGHT_TEXTBOX and a "DROPDOWN HANDLE" respectively. A "UPPER SCROLL HANDLE" corresponds to a "VERTICAL SCROLLBAR" when matched with a "LOWER SCROLL HANDLE". The sub-control classes which are not necessarily object parts may have a single direct correspondence to a control class. For example, a "RADIO BUTTON CLICKED" sub-control class to the control class "RADIO BUTTON". Details of correlation map 316 can be seen in FIG. 5. As seen, the correlation map 316 specifies that object TEXTBOX has a left textbox, and a right textbox that are aligned horizontally. Further a COMBOX has a left textbox and a dropdown handle that are aligned horizontally. For objects that have two or more constituent sub-objects, the correlation map specifies the constituent sub-objects along with a required alignment of the constituent sub-objects. A VERTICAL SCROLLBAR has an upper scrollbar handle and a lower scrollbar handle that are aligned vertically. A RADIOBUTTON, which may have two states, has a radio button that is either clicked or unclicked. For objects that have multiple states, the correlation map specifies the object together with the possible states of the object.

Figure 6:
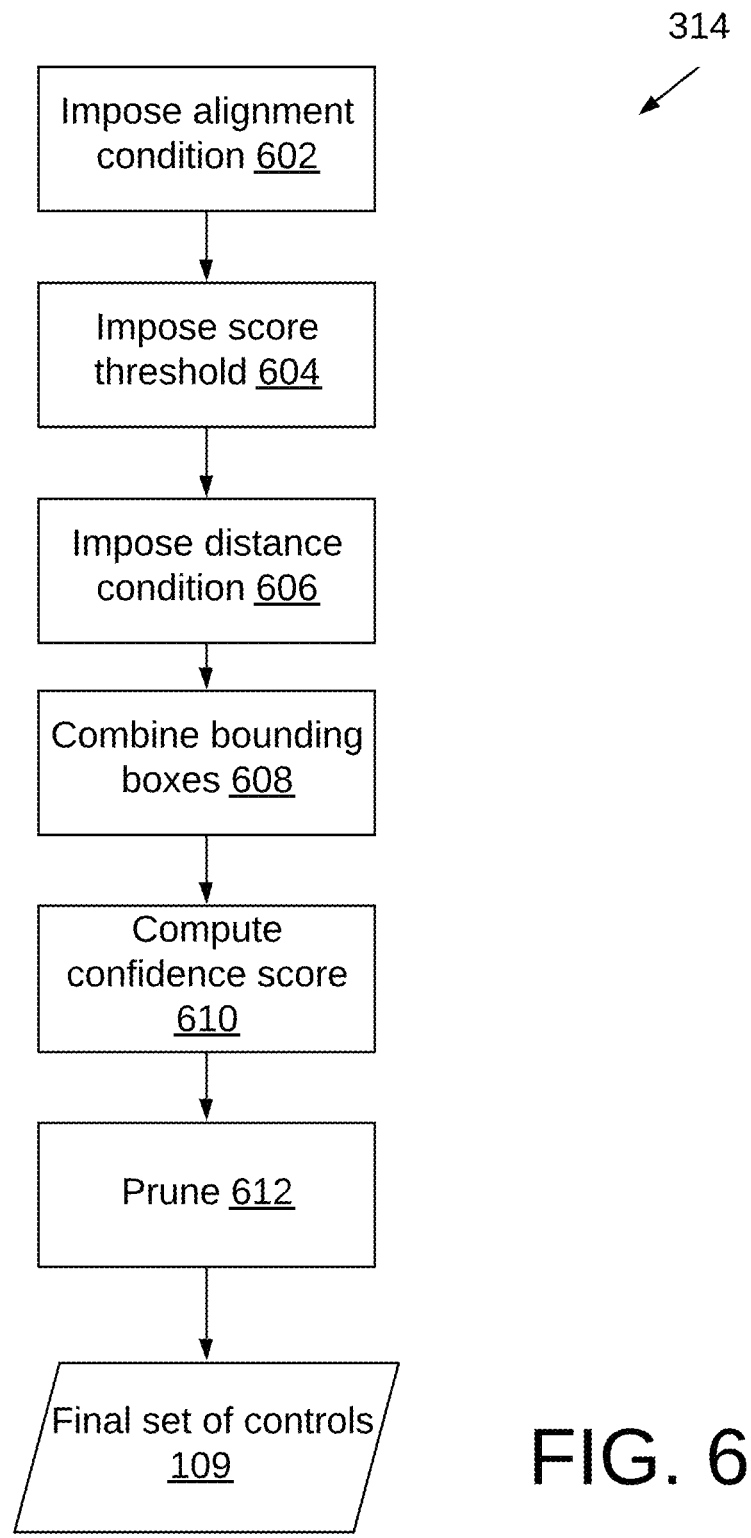
FIG. 6 is a flow diagram illustrating operation of an embodiment of control formation of FIG. 3.
Figure 10:
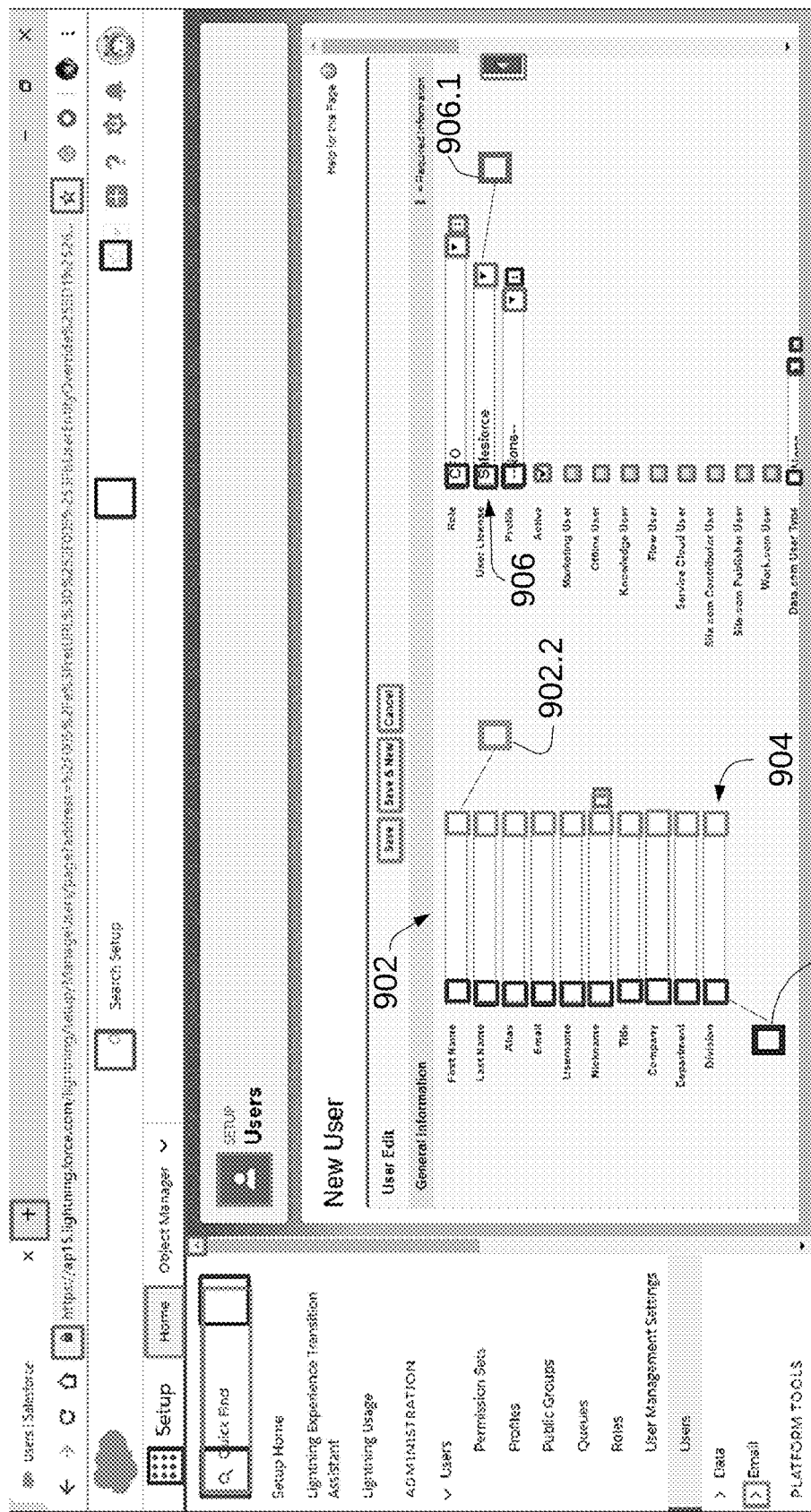

Further details of operation 314 can be seen in FIG. 6. For each sub-control $t_j$ another non-suppressed sub-control is computed at post control logic/control suppression module 108 as per the rule of correlation map 316 and is combined to output the corresponding control 109. For the sub-controls which are object parts an alignment condition is imposed at 602 in either horizontal or vertical direction depending on the sub-control. This is shown in FIG. 10 where bounding boxes 902.2, 904.1 and 906.1 are selected with better alignment conditions than 902.1, 904.2 and 906.2 respectively. In one embodiment, the alignment parameters that specify the conditions under which the alignment condition is satisfied (e.g. n number of pixels) are fixed and in another embodiment the alignment parameters are adjustable.

Figure 11:
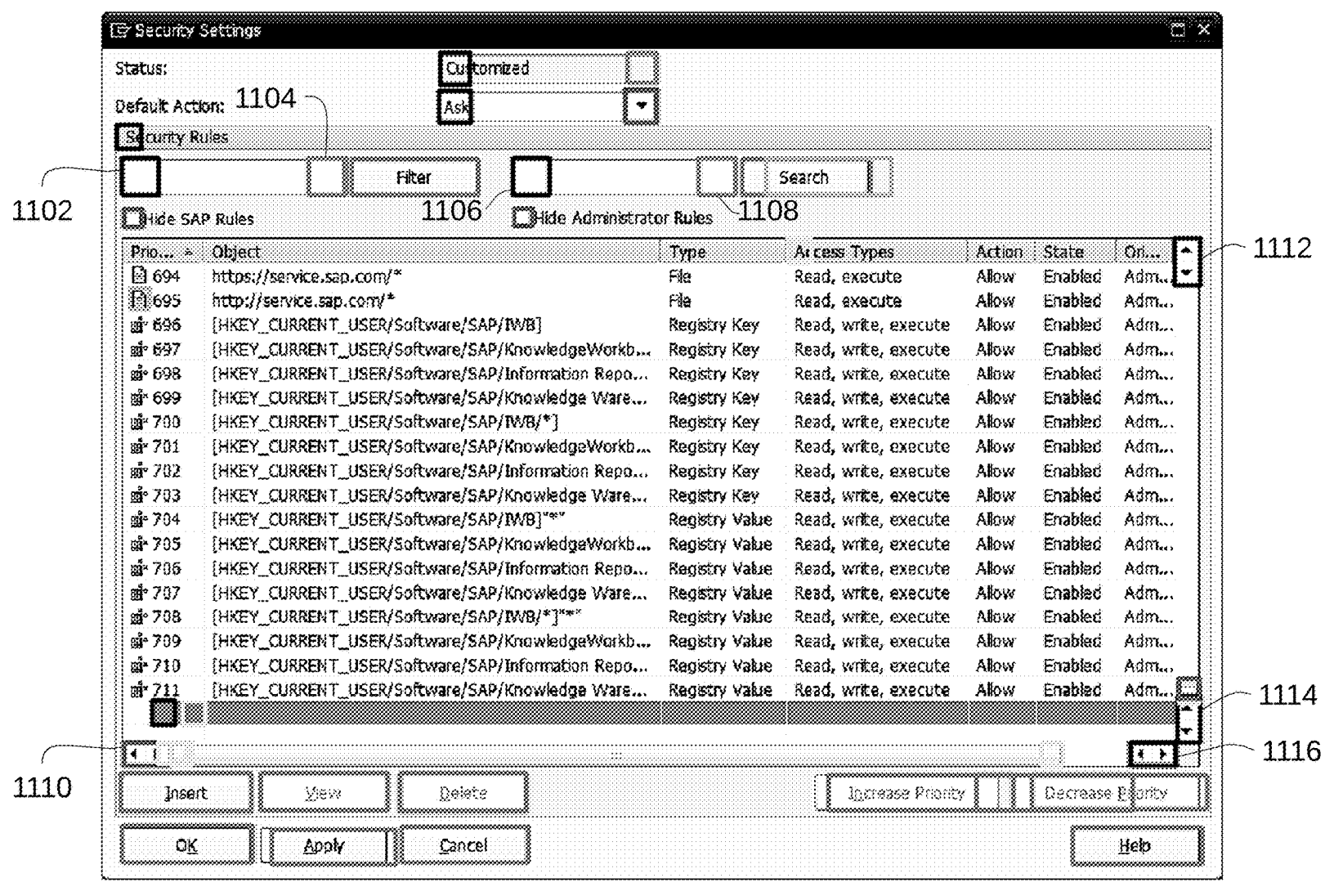

Turning to FIG. 11, the detected sub-control objects 1202, 1206 are LEFT_TEXTBOX class, 1204, 1208 are RIGHT_TEXTBOX class, 1210 is LEFT HORIZONTAL HANDLE class and 1216 is RIGHT HORIZONTAL HANDLE class. All these are candidates for alignment in the horizontal direction. The detected sub-control object 1212 is UPPER_VERTICAL_HANDLE and 1214 is LOWER_VERTICAL_SCROLLBAR and these are candidates for alignment in the vertical direction.

Additionally, score thresholds are imposed at 604 so that the matched sub-objects confidence scores fall in an interval. In the event that a sub-object falls below the interval, that sub-control object is not considered for correlation and may be designated as low quality. In one embodiment, the low-quality sub-objects may be later considered for correlation when all high-quality sub-object based correlations are exhausted. Further, a distance condition may also be imposed at 606 wherein the closest sub-object is matched first before the farther ones. This is shown in FIG. 11, where LEFT_TEXTBOX sub-object 1202 is matched to RIGHT_TEXTBOX sub-object 1204 and not to RIGHT_TEXTBOX sub-object 1208 which is further, although both are aligned to 1202 in the horizontal direction. Similarly, sub-object 1208 would be matched to LEFT_TEXTBOX sub-object 1206 and not to sub-object 1202. The bounding boxes of the sub-objects are then combined at 608 to obtain the bounding boxes of the corresponding control object. For example, the rectangle for a TEXTBOX starts from the top left corner of the corresponding LEFT TEXTBOX bounding box and ends at the bottom right corner of the RIGHT TEXTBOX bounding box. The confidence score for the TEXTBOX in question is computed at 610 as a function of the confidence scores of the corresponding LEFT TEXTBOX and RIGHT TEXTBOX, the function taking values such as maximum, minimum or average.

Figure 7:
FIG. 7 shows a sequence of screenshots of an application screen as processed by one embodiment of a system of the present disclosure, such as shown in FIG. 1.

Thus, at the end of the sub-control correlation step, a set of correlated control objects $$C=\{c_k\} \text{ where } c_k=(box_k, score_k, label_k)$$

are obtained. This set may further be pruned at 612 using a step similar to sub-object suppression wherein a set of objects are suppressed or thrown away depending on their overlap with other objects and their confidence scores. At the end of this post correlation step, a reduced list of objects is obtained and is outputted as the final result 109. An example of the result of the operations shown in FIG. 1 can be seen in FIG. 7 where input image 101 is processed to identify objects and sub-objects, as seen at 702, with the identified objects being shown at 704.

Figure 8:
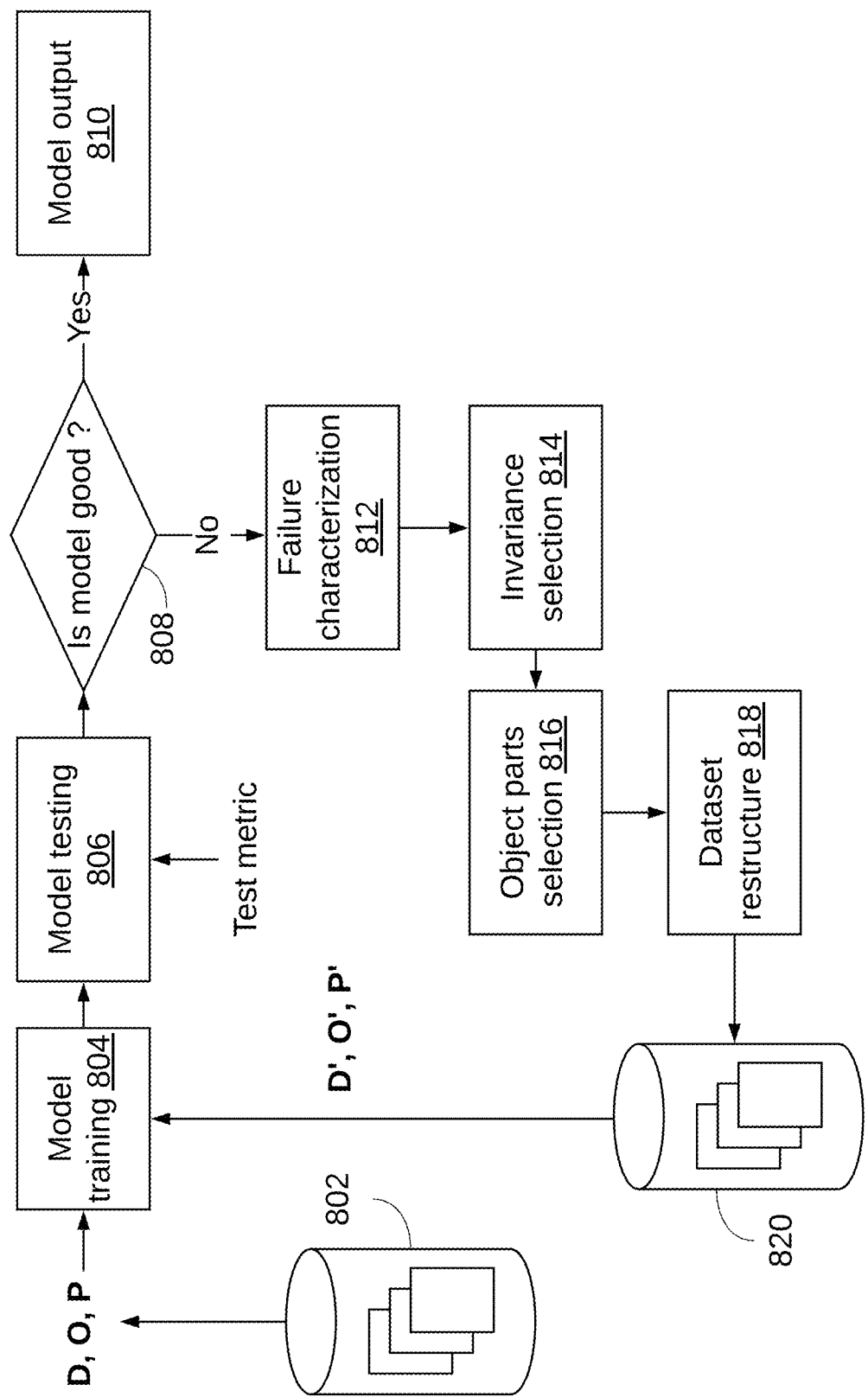
FIG. 8 is a block diagram illustrating one embodiment of a process of the present disclosure by which a trained model may be generated to detect sub-control objects in images of application screens.

An embodiment for generating a trained model that can be employed to detect sub-objects via invariance guidance is shown in FIG. 8. Given a set of object classes and a set of corresponding invariance parameters for each of the object classes, a model is trained on a given dataset representing the invariance parameters. If the learned model fails to perform well for an invariance parameter p as per a chosen metric, the corresponding object class is split into one or more sub-classes by breaking the object in parts such that each subclass now can be trained to perform well with respect to an invariance parameter p.

In FIG. 8, a dataset D, shown at 802, of datapoints is employed where each datapoint, which is an image (or a sequence of images) in this context, contains one or more instances of one or more objects from the set of objects O to be learned. Each instance of objects in each datapoint is tagged with one or more invariance parameters p from a set of invariance parameters P. An invariance parameter for an object is a parameter across which the object might vary (or take different values) yet the object definition does not change. For example, one invariance of a UI control object "TEXTBOX" is width as no matter what the width is, "TEXTBOX" is still a "TEXTBOX". Another way to look at an invariance parameter is from the machine learning system or method itself, where it is desired to have a learning system trained to detect such an object to be invariant to any value the parameter takes. For example, the same detection model should be able to detect all the textboxes of all widths.

Model training 804 involves training a model to detect a set of given objects O with dataset D with a goal for the output model to be invariant to the set of invariance parameters P. First, a model architecture is selected. In one embodiment, the model architecture consists of a convolutional Deep Neural Network (DNN) comprising a shared network, a classification network and a box regression network that processes the image region wise and outputs a set of detected boxes, the corresponding class label and the corresponding confidence scores. The model may take a number of forms. With a model that takes the form of a DNN the model can be a variety of types including Faster-RCNN, R-FCN, SSD, RetinaNet etc.

In another embodiment, the model architecture consists of a region proposal algorithm along with a shallow network classifier such as Support Vector Machines (SVM). In such a shallow network embodiment, the region proposal can take the form of an image segmentation guided sliding window approach and the classifier could be an SVM. Given a model architecture, the model training involves continuously improving the parameters of the model using the dataset until the parameters converge to an optimum value (local or global) as measured by a loss or cost function. One example of such a loss function is the weighted sum of the offsets of the detected bounding boxes for the objects compared to ground truth values, and the cross entropy between correct and detected object classes for those boxes. At the end of this stage, a model M is produced which works as an object detector meaning it takes an image as an input and outputs a set of object bounding boxes (as coordinate values in the image), the corresponding object classes, and the corresponding confidence scores. Usually, not all part of the dataset D is used for training the model, but a significantly large part of the dataset is also reserved for testing the model and is called a test dataset.

The model M trained at 804 is evaluated at 806 on the test dataset with respect to a set of test metrics. For each datapoint in the test dataset, the trained model M is applied on the datapoint and the output is collected and compared to the ground truth. The successes and failures of the detected boxes are recorded for each object instance in each image. In one embodiment, the precision and recall serve as the metric. In another embodiment, the precision and recall for just the object bounding boxes are computed agnostic to their object class labels, and precision and recall for each object class is separately computed. Based on the values of these metrics aggregated across the test dataset, the quality of the model is determined at 808. If the metric values pass certain threshold, the model is deemed good otherwise it is deemed bad. In case the model is deemed good, it becomes the final model output for use in sub-control detection 102, else characterizations of the failure cases are analyzed at 812 as follows.

The dataset D is also tagged with the invariance parameters in the set P. This means that for each object instance in each datapoint the values of the set of invariance parameters relevant to that object instance is known or computed. For example, an instance of "TEXTBOX" object is associated with several invariance parameters such as "aspect ratio", "border width", "color", "presence or absence of text inside the textbox". The parameters like "border width", "color" could be known during the creation of the dataset while parameters like "aspect ratio" can be computed from the co-ordinate values of the object bounding boxes. Similarly, for object class "RADIO BUTTON", the invariance parameter "visual style of the object when clicked" would be known during the creation of the dataset and "aspect ratio" can be again computed similar to the "TEXTBOX" class.

As noted above, during model testing at 806, for each datapoint in the test dataset, the trained model M is applied on the datapoint and the output is collected and compared to the ground truth. For each object instance in each datapoint, the model M may detect a correct bounding box as per an overlap measure, a correct or incorrect class for the bounding box, or it may completely miss that object instance. The misses as well as incorrect predictions are designated as the failure cases. For each case where an expected object is either detected incorrectly or is missing, it is flagged with every invariance parameter associated with that object class. For each invariance parameter p, a vector of dimension equal to the possible values or range of values for the parameter p is computed starting with values which are all equal to zero. For a failed object instance (and/or datapoint), for the invariance parameter p, one of the corresponding vector's coordinates gets updated with a value zero or one added to it depending on the success or failure of the prediction/detection by M. Which coordinate gets updated this way depends on the value taken for that parameter on this object instance, for example equal to the value or the range this value falls in. This results in a set of vectors representing the failures with respect to each of the invariance parameters. Additional vectors for each invariance parameter may also be computed to separate the characterization of different types of failures (e.g. bounding box detection misses versus bounding box class errors). At the end of this stage, for each object class, for each of the invariance parameter of this object class, there is at least one vector computed as described above representing the statistics of the failures of that object class across the test dataset part of the dataset D.

For example, consider the case of UI control object class "TEXTBOX". In one embodiment, the model fails mostly on the instances where aspect ratio is large (e.g. greater than 30) and misses all where aspect ratio is very large (e.g. greater than 50). In such a case the vector representing the failures for the invariance parameter "aspect ratio" distributed across values is skewed in the aspect ratio interval [30, 200]. This implies that the model is struggling to learn invariance to large aspect ratios for the "TEXTBOX" class.

Invariance selection 814 operates as follows. For each invariance parameter of each object class the corresponding vector computed during failure characterization is used and a probability distribution vector is generated by normalizing that vector, that is by dividing value of each coordinate of the vector by the sum of values for all the coordinates. An entropy for this probability distribution vector is then computed and this invariance parameter is selected if the entropy lies within a certain interval. For example, in the case of TEXTBOX class with invariance parameter "aspect ratio" the corresponding probability distribution will be skewed in the parameter interval [30, 200] leading to a low entropy value meaning concentration of failures in high aspect ratio range and therefore this invariance parameter "aspect ratio" is selected. Similarly, in the case of "RADIO BUTTON" for the invariance parameter "visual style of the object when clicked", the probability distribution is not skewed towards any value errors and entropy is very high except that the object instances where RADIO BUTTON is unclicked has hardly any failures which is unexpected leading to the selection of this invariance parameter.

Object parts selection 816 operates as follows. For an invariance parameter selected during the last step, the corresponding object class is broken into two or more sub-classes by computing an invariance removal score for a set of object deconstruction scenarios and choosing the one which is above a certain threshold and/or the one with the best score. An example of such a set of object deconstruction is:

a. breaking the object into left and right parts with aspect ratio equals or close to 1
b. breaking the object into upper and lower parts with aspect ratio equals or close to 1
c. breaking the objects into specific functional sub-parts e.g. a scrollbar into scrollbar handles.
d. breaking not into parts but into sub-classes based on the failure probability distribution.

Some examples corresponding to these object deconstruction scenarios are—
(i) "TEXTBOX" into "LEFT_TEXTBOX" and "RIGHT_TEXTBOX" with aspect ratios very close to 1 guided by invariance parameter "aspect ratio" which follows (a);
(ii) "COMBOBOX/DROPDOWN" into "LEFT_TEXTBOX" and "DROPDOWN_HANDLE" which follows (a) and (c).
(iii) "VERTICAL SCROLLBARS" into "UPPER SCROLLBAR HANDLE" and "LOWER SCROLLBAR HANDLE" which follows (c).
(iv) "RADIO BUTTON" into "CLICKED RADIO BUTTON" and "UNCLICKED RADIO BUTTON" which follows (d)
(v) "TEXTBOX" into "TEXTBOX", "SEARCH BOX" (textboxes with search button inside them) and "ICON BOX" (textboxes with calendar and/or other icons inside them) which follows (d)

As shown, (i) relieves the "TEXTBOX" class out of invariance parameter "aspect ratio"; (ii) & (iii) does the same to "COMBOBOX" and "VERTICAL SCROLLBARS" respectively; (iv) relieves the "RADIO BUTTON" class from invariance parameter "visual style of the object when clicked"; and (v) relieves the "TEXTBOX" from invariance parameter "presence or absence of image icons inside".

At the end of this stage, for one or more selected invariance parameters, object parts are selected at 816, therefore for each object class there is one or more object classes now i.e. either no change or a deconstruction into two or more object parts or sub-classes. This gives a new and larger set of object classes O'.

The dataset D is now restructured at 818 to account for the new object classes O'. If an object class X from O was deconstructed into a set of object parts or subclasses {X1, X2, . . . , Xk} which is now a part of O', for each datapoint in D for each instance of the object X we deconstruct that object instance into instance of one or more of {X1, X2, . . . , Xk} and these instances are tagged with their own bounding boxes, object class names as well as the values of the invariance parameters. This operation is performed for each object instance of each class for each datapoint in D to obtain the restructured dataset D'. This new dataset D' 820, along with new object class set O', and original invariance parameter P i.e. (D', O', P) now becomes the input to the model training operation 804 in the next iteration of invariance guided learning until a desirable model is determined at 808.

The detected control objects 109 may be employed in a robotic process automation system. In such a system, a software robot (also referred to as a bot) comprises a plurality of sets of task processing instructions. Each set of task processing instructions is operable to interact at a user level with one or more designated user level application programs (not shown). A bot that employs the detected control objects 109 can operate to detect application control objects in an application in an environment where only the application screen image is available to the bot. With the detected application control objects, the bot can perform the task processing instructions to interact with the application(s) specified in the task processing instructions. In one embodiment, a trained model may be generated by way of a computer-implemented method which detects one or more user interface objects contained in a screen image of a user interface that is generated by an application program. A dataset is selected that comprises a plurality of object classes where each object class corresponds to a type of user interface object and comprises at least one variance parameter. A machine learning model is trained with a portion of the dataset designated as a training portion of the dataset to cause the machine learning model to detect, in the training portion of the dataset, objects in each of the plurality of object classes. The machine learning model is tested with a portion of the dataset, that is designated as a testing portion of the dataset, to determine if the machine learning model can detect objects in the plurality of object classes with an accuracy above a predetermined set of test metrics. If the machine learning model exhibits an accuracy that does not meet the predetermined set of test metrics, then the testing portion of the dataset is processed to generate, for each object class in the testing portion of the dataset, a vector that represents failure of the machine learning model with respect to each variance parameter of a corresponding object class. Also, a first set of variance parameters is generated by selecting from among the vectors, variance parameters that fall within a predetermined variance range. An updated dataset comprising updated object classes is generated by, for each variance parameter within the first set of variance parameters, segmenting the object class to which the variance parameter within the first set of variance parameters corresponds, into two or more sub-classes. The machine learning model is retrained with a portion of the updated dataset designated as an updated training portion of the dataset to cause the machine learning model to detect, in the updated training portion of the dataset, objects in each of the plurality of object classes.

The embodiments herein can be implemented in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Figure 12:
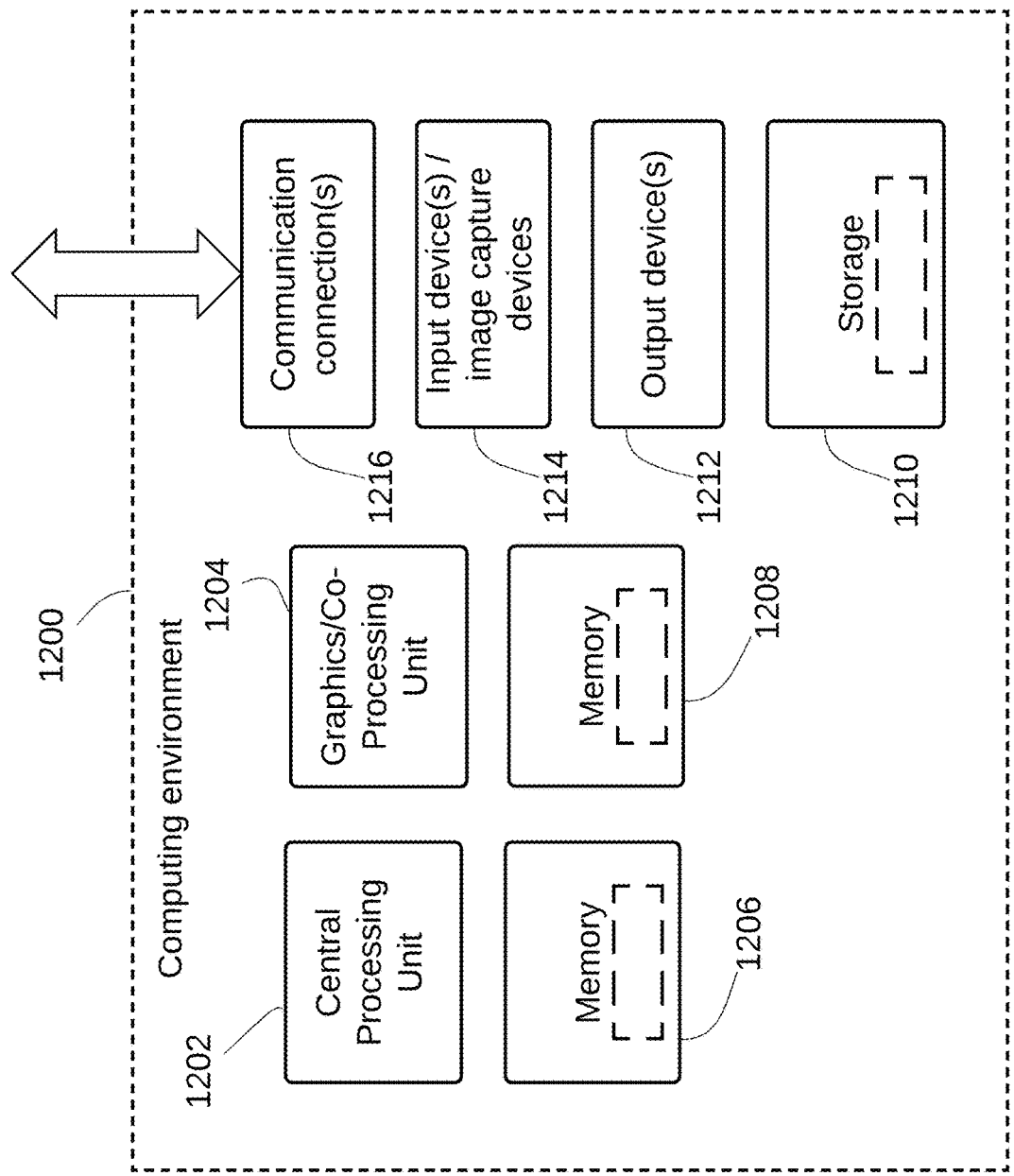
FIG. 12 illustrates a block diagram of hardware that may be employed in an implementation of the Robotic Process Automation (RPA) systems disclosed herein.

FIG. 12 illustrates a block diagram of hardware that may be employed in an implementation of the RPA system as disclosed herein. FIG. 12 depicts a generalized example of a suitable general-purpose computing system 1200 in which the described innovations may be implemented in order to improve the processing speed and efficiency with which the computing system 1200 operates to perform the functions disclosed herein. With reference to FIG. 12 the computing system 1200 includes one or more processing units 1202, 1204 and memory 1206, 1208. The processing units 1202, 1206 execute computer-executable instructions. A processing unit can be a general-purpose central processing unit (CPU), processor in an application-specific integrated circuit (ASIC) or any other type of processor. The tangible memory 1206, 1208 may be volatile memory (e.g., registers, cache, RAM), non-volatile memory (e.g., ROM, EEPROM, flash memory, etc.), or some combination of the two, accessible by the processing unit(s). The hardware components in FIG. 12 may be standard hardware components, or alternatively, some embodiments may employ specialized hardware components to further increase the operating efficiency and speed with which the system 10 operates. The various components of computing system 1200 may be rearranged in various embodiments, and some embodiments may not require nor include all of the above components, while other embodiments may include additional components, such as specialized processors and additional memory.

Computing system 1200 may have additional features such as for example, storage 1210, one or more input devices 1214, one or more output devices 1212, and one or more communication connections 1216. An interconnection mechanism (not shown) such as a bus, controller, or network interconnects the components of the computing system 1200. Typically, operating system software (not shown) provides an operating system for other software executing in the computing system 1200, and coordinates activities of the components of the computing system 1200.

The tangible storage 1210 may be removable or non-removable, and includes magnetic disks, magnetic tapes or cassettes, CD-ROMs, DVDs, or any other medium which can be used to store information in a non-transitory way, and which can be accessed within the computing system 1200. The storage 1210 stores instructions for the software implementing one or more innovations described herein.

The input device(s) 1214 may be a touch input device such as a keyboard, mouse, pen, or trackball, a voice input device, a scanning device, or another device that provides input to the computing system 1200. For video encoding, the input device(s) 1214 may be a camera, video card, TV tuner card, or similar device that accepts video input in analog or digital form, or a CD-ROM or CD-RW that reads video samples into the computing system 1200. The output device(s) 1212 may be a display, printer, speaker, CD-writer, or another device that provides output from the computing system 1200.

The communication connection(s) 1216 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with the disclosed embodiments, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computer-implemented method for detecting one or more user interface objects contained in a screen image of a user interface generated by an application program, the method comprising:
receiving an image file containing the one or more user interface objects of the user interface generated by the application program;
identifying a set of sub-control objects in the image file, each of the sub-control objects forming a portion of a user interface object of the one or more user interface objects that receives user input; and
correlating the sub-control objects in the identified set of sub-control objects to combine one or more of the sub-control objects in the identified set of sub-control objects to form one or more controls that correspond to certain one or more of the one or more user interface objects, wherein the correlating the sub-control objects includes at least:
imposing a distance condition to distinguish a sub-control object that is closer in distance to a sub-control object under consideration than another sub-control object; and
matching the sub-control object under consideration to the distinguished sub-control object based on at least the distance condition;
combining each set of the corresponding matched sub-control objects to generate a corresponding combined control;
generating a confidence score for each of the combined controls;
determining whether any of the combined controls has a confidence score below a threshold level; and
removing any of the combined controls that has a confidence score below the threshold level to generate a final set of controls that corresponds to user interface objects of the user interface generated by the application program.

2. The computer-implemented method of claim 1, wherein the correlating the sub-control objects includes at least imposing an alignment condition to align at least two of the sub-control objects that correspond to a user interface object, and
wherein the matching the sub-control object under consideration to the distinguished sub-control object is based on at least the distance condition and the alignment condition.

3. The computer-implemented method of claim 1, wherein the image file contains an image representation of the one or more user interface objects of the user interface generated by the application program; and wherein the detecting of the sub-control objects in the image file comprises detecting the sub-control objects from the image representation of the sub-control objects.

4. The computer-implemented method of claim 1, wherein the method comprises:

detecting one or more of the sub-control objects that are extraneous because they overlap with or that are within a predetermined vicinity of the identified set of sub-control objects; and removing the one or more extraneous sub-control objects that are detected as being extraneous.

5. The computer-implemented method of claim 4, wherein the removing extraneous sub-control objects comprises, for at least one given sub-control object in the identified set of sub-control objects:

detecting one or more of the sub-control objects that overlap with the given sub-control object in the identified set of sub-control objects; and removing the one or more detected sub-control objects that overlap with the sub-control object in the identified set of sub-control objects.

6. The computer-implemented method of claim 1, wherein the removing extraneous sub-control objects comprises, for at least one given sub-control object in the identified set of sub-control objects:

retrieving a confidence score associated with the given sub-control object in the identified set of sub-control objects; and removing the given sub-control object from the identified set of sub-control objects if the confidence score therefor is below a first threshold score.

7. The computer-implemented method of claim 1, wherein removing extraneous sub-control objects comprises, for at least one given sub-control object in the identified set of sub-control objects:

identifying one or more of the sub-control objects that overlap with the given sub-control object in the identified set of sub-control objects;

removing the identified sub-control objects that overlap with the given sub-control object in the identified set of sub-control objects;

determining a confidence score associated with the given sub-control object in the identified set of sub-control objects; and removing the given sub-control object from the identified set of the sub-control objects if the confidence score therefor is below a first threshold score.

8. The computer-implemented method of claim 7, wherein the correlating the sub-control objects includes at least imposing an alignment condition to align at least two of the sub-control objects that correspond to a user interface object, and wherein the matching the sub-control object under consideration to the distinguished sub-control object is based on at least the distance condition and the alignment condition.

9. The computer-implemented method of claim 8, wherein the image file contains an image representation of the one or more user interface objects of the user interface generated by the application program; and wherein the detecting of the sub-control objects in the image file comprises detecting the sub-control objects from the image representation of the sub-control objects.

10. The computer-implemented method of claim 1, wherein the correlating sub-control objects includes at least:

accessing a correlation map that provides a mapping between user interface objects of the user interface and sub-control objects associated with each user interface object.

11. The computer-implemented method of claim 1, wherein the generating of a confidence score for each of the combined controls comprises generating the confidence score for each of the combined controls as a function of confidence scores associated with each of the sub-control objects that form the corresponding combined control.

12. A computer-implemented method for detecting one or more user interface objects contained in a screen image of a user interface generated by an application program, the method comprising:

receiving an image file containing one or more user interface objects of a user interface generated by an application program;

identifying a set of sub-control objects in the image file, each of the sub-control objects in the identified set of sub-control objects forming a portion of a user interface object of the one or more user interface objects that receives user input; and correlating the sub-control objects in the identified set of sub-control objects to combine one or more of the sub-control objects in the identified set of sub-control objects to form one or more controls that correspond to certain one or more user interface objects, wherein the correlating the sub-control objects includes at least:

imposing an alignment condition to align at least two of the sub-control objects that correspond to a user interface object;

imposing a confidence value on each of the sub-control objects and removing those of the sub-control objects having a confidence value that falls below a threshold level; and matching the sub-control object under consideration to another sub-control object of the sub-control objects based on at least the alignment condition.

13. The computer-implemented method of claim 12, wherein the method comprises:

combining each set of corresponding matched sub-control objects to generate a corresponding combined control;

generating a confidence score for each of the combined controls; and removing at least one of the combined controls that has a confidence score below a threshold level to generate a final set of controls that corresponds to user interface objects of the user interface generated by the application program.

14. The computer-implemented method of claim 13, wherein the generating of a confidence score for each of the combined controls comprises generating the confidence score for each of the combined controls as a function of confidence scores associated with each of the sub-control objects that form the corresponding combined control.

15. The computer-implemented method of claim 12, wherein the method comprises:

detecting one or more of the sub-control objects that are extraneous because they overlap with or that are within a predetermined vicinity of the identified set of sub-control objects; and removing the one or more extraneous sub-control objects that are detected as being extraneous.

16. The computer-implemented method of claim 12, wherein the correlating the sub-control objects includes at least:
   determining a distance condition to distinguish a sub-control object that is closer in distance to a sub-control object under consideration to than one or more other of the sub-control objects, and
   wherein the matching the sub-control object under consideration to the another sub-control object is based on at least the distance condition and the alignment condition.

17. The computer-implemented method of claim 12, wherein the image file contains an image representation of the one or more user interface objects of the user interface generated by the application program; and
   wherein the detecting of the sub-control objects in the image file comprises detecting the sub-control objects from the image representation of the sub-control objects.

18. The computer-implemented method of claim 12, wherein removing extraneous sub-control objects comprises, for at least one sub-control object in the identified set of sub-control objects:
   identifying sub-control objects that overlap with the sub-control object in the identified set of sub-control objects;
   removing sub-control objects that overlap with the sub-control object in the identified set of sub-control objects; and
   retrieving a confidence score associated with the sub-control object in the identified set of sub-control objects and removing sub-control objects having a confidence score below a first threshold score.

19. The computer-implemented method of claim 12, wherein correlating sub-control objects includes at least:
   accessing a correlation map that provides a mapping between user interface objects of the user interface and sub-control objects associated with each user interface object.

20. A computer system, comprising:
   data storage having stored thereupon a plurality of image files, each image file containing one or more user interface objects of a user interface generated by an application program; and
   a processor, programmed with instructions that cause the processor to detect one or more user interface objects contained in a screen image of a user interface generated by an application program by way of invariance guided sub-control learning, the instructions when executed by the processor operate to at least:
      receive an image file containing the one or more user interface objects of the user interface generated by the application program;
      identify a set of sub-control objects in the image file, each of the sub-control objects forming a portion of a user interface object of the one or more user interface objects that receives user input; and
      correlate the sub-control objects in the identified set of sub-control objects to combine one or more of the sub-control objects in the identified set of sub-control objects to form one or more controls that correspond to certain one or more of the one or more user interface objects, wherein the correlating the sub-control objects includes at least:
         impose a distance condition to cause a sub-control object that is closer in distance to a sub-control object under consideration than another of the sub-control objects; and
         match the sub-control object under consideration to the another of the sub-control object based on at least the distance condition;
         combine each set of corresponding matched sub-control objects to generate a corresponding combined control;
         generate a confidence score for each of the combined controls; and
         remove at least one of the combined controls that has a confidence score below a threshold level to generate a final set of controls that corresponds to user interface objects of the user interface generated by the application program.

21. A tangible storage medium, having stored thereupon computer program code for execution on a computer system, the computer program code executing on a server processor to cause the computer system to perform a computer-implemented method for detecting one or more user interface objects contained in a screen image of a user interface generated by an application program, the computer-implemented method comprising:
   receiving an image file containing one or more user interface objects of a user interface generated by an application program;
   identifying a set of sub-control objects in the image file, each of the sub-control objects in the identified set of sub-control objects forming a portion of a user interface object of the one or more user interface objects that receives user input; and
   correlating the sub-control objects in the identified set of sub-control objects to combine one or more of the sub-control objects in the identified set of sub-control objects to form one or more controls that correspond to certain one or more user interface objects, wherein the correlating the sub-control objects includes at least:
      imposing an alignment condition to align at least two of the sub-control objects that correspond to a user interface object; and
      matching the sub-control object under consideration to the another sub-control object based on at least the alignment condition.

22. A tangible storage medium of claim 21, wherein the computer-implemented method comprises:
   imposing a confidence value on each of the sub-control objects and removing those of the sub-control objects having a confidence value that falls below a threshold level.

* * * * *